US012222795B2

(12) United States Patent
Song et al.

(10) Patent No.: US 12,222,795 B2
(45) Date of Patent: Feb. 11, 2025

(54) METHOD FOR SETTING SHIPPING MODE, ELECTRONIC DEVICE, AND COMPUTER-READABLE STORAGE MEDIUM

(71) Applicant: XI'AN WENXIAN SEMICONDUCTOR TECHNOLOGY CO. LTD, Shaanxi (CN)

(72) Inventors: Lijun Song, Shaanxi (CN); Pengliang Song, Shaanxi (CN)

(73) Assignee: XI'AN WENXIAN SEMICONDUCTOR TECHNOLOGY CO. LTD, Shaanxi (CN)

( * ) Notice: Subject to any disclaimer, the term of this patent is extended or adjusted under 35 U.S.C. 154(b) by 78 days.

(21) Appl. No.: 18/110,174

(22) Filed: Feb. 15, 2023

(65) Prior Publication Data

US 2023/0196269 A1    Jun. 22, 2023

Related U.S. Application Data

(63) Continuation-in-part of application No. PCT/CN2021/115169, filed on Aug. 27, 2021.

(30) Foreign Application Priority Data

Mar. 1, 2021  (CN) .......................... 202110224611.4

(51) Int. Cl.
G06F 1/3287    (2019.01)
G06F 1/3206    (2019.01)
G06Q 10/0832   (2023.01)

(52) U.S. Cl.
CPC .......... *G06F 1/3287* (2013.01); *G06F 1/3206* (2013.01); *G06Q 10/0832* (2013.01)

(58) Field of Classification Search
CPC .................................................. G06Q 10/0832
See application file for complete search history.

(56) References Cited

U.S. PATENT DOCUMENTS

2012/0317430 A1* 12/2012 Rahman .............. A61B 5/7455
                                                         713/323
2013/0229145 A1    9/2013 Alessandro et al.
(Continued)

FOREIGN PATENT DOCUMENTS

CN    102023912 A    4/2011
CN    105375549 A    3/2016
(Continued)

OTHER PUBLICATIONS

"Guangdong OPPO Mobile Telecommunications Seeks Patent for Energy-Saving Method of Earphone, Earphone, Electronic Equipment and Storage Medium" May 31, 2023, Global IP News. Electronics Patent News. (Year: 2023).*

(Continued)

*Primary Examiner* — Michael P Harrington
*Assistant Examiner* — Matthew Parker Goodman
(74) *Attorney, Agent, or Firm* — Brooks Kushman P.C.

(57) ABSTRACT

A method for setting a shipping mode of an electronic device. The method includes the following steps: receiving a shipping instruction sent by a host computer to enter the shipping mode; and sending a shipping-mode feedback instruction to the host computer, where the shipping-mode feedback instruction is a valid-response instruction for a successful entry into the shipping mode or an invalid-response instruction for a failed entry into the shipping mode. An electronic device and a computer readable storage medium are also provided in this application. The method for setting the shipping mode, the electronic device and the computer readable storage medium can accurately feed back whether the electronic device has successfully entered the (Continued)

shipping mode, to avoid a problem that the electronic device not really entering the shipping mode can leave the factory due to omission, improving users' experience.

9 Claims, 4 Drawing Sheets

(56) References Cited

U.S. PATENT DOCUMENTS

| | | | | |
|---|---|---|---|---|
| 2016/0049815 A1* | 2/2016 | Wu | ............ | H02J 7/0031 320/134 |
| 2017/0366030 A1 | 12/2017 | Lee | | |
| 2019/0097435 A9* | 3/2019 | Stewart | ............ | H02J 7/0047 |
| 2019/0124432 A1* | 4/2019 | Champy | ............ | H04R 1/1025 |

FOREIGN PATENT DOCUMENTS

| | | | |
|---|---|---|---|
| CN | 106501585 A | | 3/2017 |
| CN | 107291592 A | | 10/2017 |
| CN | 207010317 U | | 2/2018 |
| CN | 109144216 A | | 1/2019 |
| CN | 109390992 A | | 2/2019 |
| CN | 110021976 A | | 7/2019 |
| CN | 110609713 A | | 12/2019 |
| CN | 110719543 A | | 1/2020 |
| CN | 111277040 A | | 6/2020 |
| CN | 111400080 A | * | 7/2020 |
| CN | 211266506 U | | 8/2020 |
| CN | 211377619 U | * | 8/2020 |
| CN | 112039153 A | | 12/2020 |
| JP | 2011055603 A | * | 3/2011 |
| JP | 2011139550 A | * | 7/2011 |
| KR | 2022-017305 A1 | * | 2/2022 |
| WO | WO-2022006697 A1 | * | 1/2022 |
| WO | WO-2022030797 A1 | * | 2/2022 |

OTHER PUBLICATIONS

"Shenzhen Nengxin Semiconductor Submits Chinese Patent Application for Method and System for Realizing TWS Earphone Reset by Using Battery Protection Chip U5 Shipping Mode" Jun. 27, 2023, Global IP News. Consumer Electronics Patent News (Year: 2023).*

Gong J et al.; Design of a Low-power Transportation Status Monitor Based on Near Field Communication; Computer Measurement and Control; 2019.

* cited by examiner

METHOD FOR SETTING SHIPPING MODE, ELECTRONIC DEVICE, AND COMPUTER-READABLE STORAGE MEDIUM

CROSS-REFERENCE TO RELATED APPLICATIONS

This application is a continuation-in-part of International Application No. PCT/CN2021/115169, filed on Aug. 27, 2021, which claims the benefit of Chinese Patent Application No. 202110224611.4, filed on Mar. 1, 2021, the entire contents of which are incorporated herein by reference.

BACKGROUND

1. Technical Field

The present application relates to the field of electronic technology, and in particular to a method for setting a shipping mode, an electronic device, and a computer readable storage medium.

2. Description of Related Art

After the electronic device is manufactured in the factory, to maintain the power of the electronic device after a long time of transportation and storage, the electronic device needs to be charged with a preset amount of electricity and switched to a shipping mode. After entering the shipping mode, the electronic device will be in the state of power failure, and the battery will stop supplying power to the electronic device, to save the electric power for the electronic device during the long-term transportation and storage. When the user gets hold of the electronic device, the electric device can be used normally for the first time.

In the prior art, before the electronic device leaves the factory, a shipping instruction of entering the shipping mode is sent to the electronic device by the system test machine at the factory side, and the electronic device implements an operation of entering the shipping mode according to the shipping instruction, to enable the electric device to enter the shipping mode. However, in the prior art, after the instruction of entering the shipping mode is sent to the electronic device through the system test machine, the electronic device may successfully enter the shipping mode at an end of a preset time, while no feedback information is sent to the system test machine, the system test machine cannot confirm whether the electronic device has really entered the shipping mode due to a lack of closed-loop monitoring. In this way, it is defaulted that electronic device has entered the shipping mode when no feedback information is received by the system test machine in cases that some electronic devices fail to enter the shipping mode or fail to send feedback information due to failure. As a result, some electronic devices without entering the shipping mode or with faulty are sold by ex-factory. When the user gets those electronic devices that cannot be turned on normally or cannot be used normally, the user's experience can be affected.

SUMMARY

One objective of the present application is to provide a method for setting a shipping mode, an electronic device, and a computer readable storage medium, to establish a instruction answering mechanism in the electronic device, which enables the electronic device to receive the shipping instruction sent by a host computer, and feed back a confirmation instruction to the host computer after entering the shipping mode, solving a problem that the electronic devices not really entering the shipping mode can leave the factory due to omission.

To solve the above problem, an embodiment of the present application provides a method for setting a shipping mode of an electronic device, the method includes steps of: receiving a shipping instruction sent by a host computer to enter the shipping mode; and sending a shipping-mode feedback instruction to the host computer. The shipping-mode feedback instruction is a valid-response instruction for a successful entry into the shipping mode or an invalid-response instruction for a failed entry into the shipping mode.

Optionally, the electronic device includes a master control module and a battery protection module electrically connected to the master control module.

The step of receiving the shipping instruction sent by the host computer to enter the shipping mode also includes steps of: receiving, by the master control module, the shipping instruction sent by the host computer to enter the shipping mode; and receiving, by the battery protection module, the shipping instruction sent by the master control module.

The step of sending the shipping-mode feedback instruction to the host computer also includes steps of: sending, by the master control module, a valid-response instruction to the host computer in case that a shipping confirmation signal sent by the battery protection module is received within a preset time; and sending, by the master control module, an invalid-response instruction to the host computer in case that the shipping confirmation signal sent by the battery protection module is not received within the preset time.

Optionally, the electronic device is a TWS headset, the TWS headset includes a headset body and a charging case for accommodating the headset body, and the master control module and the battery protection module are arranged in the headset body.

The step of receiving, by the master control module, the shipping instruction sent by the host computer to enter the shipping mode also includes steps of: receiving, by the charging case, the shipping instruction sent by the host computer to enter the shipping mode; and receiving, by the master control module, the shipping instruction sent by the charging case.

The step of sending, by the master control module, a valid-response instruction to the host computer also includes steps of: sending, by the master control module, a valid-response instruction to the charging case; and sending, by the charging case, a valid-response instruction to the host computer.

The step of sending, by the master control module, the invalid-response instruction to the host computer also includes steps of: sending, by the master control module, the invalid-response instruction to the charging case; and sending, by the charging case, the invalid-response instruction to the host computer.

Optionally, after the step of sending, by the charging case, the valid-response instruction to the host computer, the method also includes a step of: entering the shipping mode.

Optionally, the shipping instruction, the shipping-mode feedback instruction and the shipping confirmation signal are respectively in a form of code, pulse or level.

In accordance with another embodiment of the present application, an electronic device is provided, which includes a processor and a memory coupled to each other, the processor is configured to execute program instructions stored in the memory to implement the aforementioned method for setting a shipping mode.

In accordance with another embodiment of the present application, a computer readable storage medium is provided having program instructions stored thereon, the program instructions, when being executed by the processor, causes the aforementioned method for setting the shipping mode to be implemented.

In accordance with another embodiment of the present application, an electronic device is provided, including a master control module and a battery protection module, the master control module is provided with an input-and-output pin, the battery protection module is provided with a shipping pin. The shipping instruction is transmitted from the input-and-output pin to the shipping pin when the shipping instruction sent by the host computer to enter the shipping mode is received by the master control module. A shipping-mode feedback instruction is sent by the master control module to the host computer according to whether the shipping confirmation signal fed back via the shipping pin is received by the master control module; where the shipping-mode feedback instruction is a valid-response instruction for a successful entry into the shipping mode or an invalid-response instruction for a failed entry into the shipping mode.

Optionally, the input-and-output pin include a first input-and-output pin and a second input-and-output pin, and the battery protection module is also provided with a feedback pin, and the shipping instruction is transmitted from the first input-and-output pin to the shipping pin, and the feedback instruction is sent from the feedback pin to the second input-and-output pin.

Optionally, the electronic device is TWS headset.

Beneficial effects of the present application are that: the method for setting a shipping mode, an electronic device and a computer readable storage medium are disclosed in the present application, and the method for setting the shipping mode of the present application can actively sends a shipping-mode feedback instruction to the host computer after receiving a shipping instruction, making it possible to clearly know at the factory side whether the electronic device has successfully entered the shipping mode, avoiding the problem that the electronic device not really entering the shipping mode can leave the factory due to omission, which can improve the user experience.

DETAILED DESCRIPTION

Figure 1:
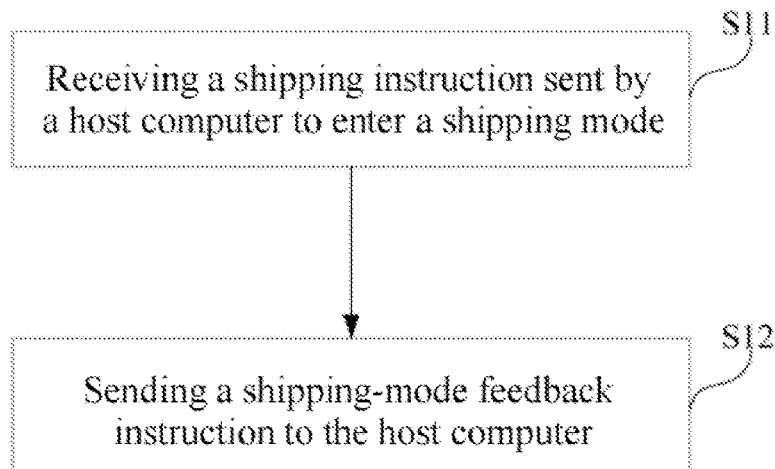
FIG. 1 is a schematic flow diagram of a method for setting a shipping mode of an electronic device in accordance with a first embodiment of the present application.

To facilitate the understanding of the present application, the following will illustrate the present application in more detail with reference to the drawings and specific embodiments. Exemplary embodiments of the present application are given in the drawings. However, the present application may be implemented in many different forms and is not limited to the embodiments described in this specification. Rather, these embodiments are provided for the purpose of providing a more thorough and comprehensive understanding of the disclosure of the present application.

It should be noted that, unless otherwise defined, all technical and scientific terms used in this specification have the same meaning as commonly understood by persons skilled in the field to which the present application is related. The terms used in the specification of the present application are intended only for the purpose of describing specific embodiments and are not intended to limit the present application. The term "and/or" as used in this specification includes any and all combinations of one or more of the relevant listed items.

Referring to FIG. 1, FIG. 1 is a flow diagram of a method for setting a shipping mode of an electronic device in a first embodiment of the present application. The method for setting the shipping mode of the electronic device in this embodiment includes steps S11 and S12.

In step S11: a shipping instruction sent by a host computer to enter the shipping mode is received.

In this embodiment, the electronic device may be a TWS headset, a cell phone, a tablet computer, etc. In this embodiment, the electronic device is optionally connected to the host computer through a serial port, and the shipping instruction is sent through the serial port. The shipping instruction may be in the form of code, pulse or level, which is not limited in this application, and in other embodiments, the shipping instruction may also be in other forms of private protocols.

In step S12: a shipping-mode feedback instruction is sent to the host computer, and the shipping-mode feedback instruction is a valid-response instruction for a successful entry into the shipping mode or an invalid-response instruction for a failed entry into the shipping mode.

In this embodiment, the electronic device will actively send a clear indication to the host computer regardless of whether the electronic device successfully enters the shipping mode, so that the electronic device in the state of not entering the shipping mode can be prevented from being sold out of the factory.

Figure 2:
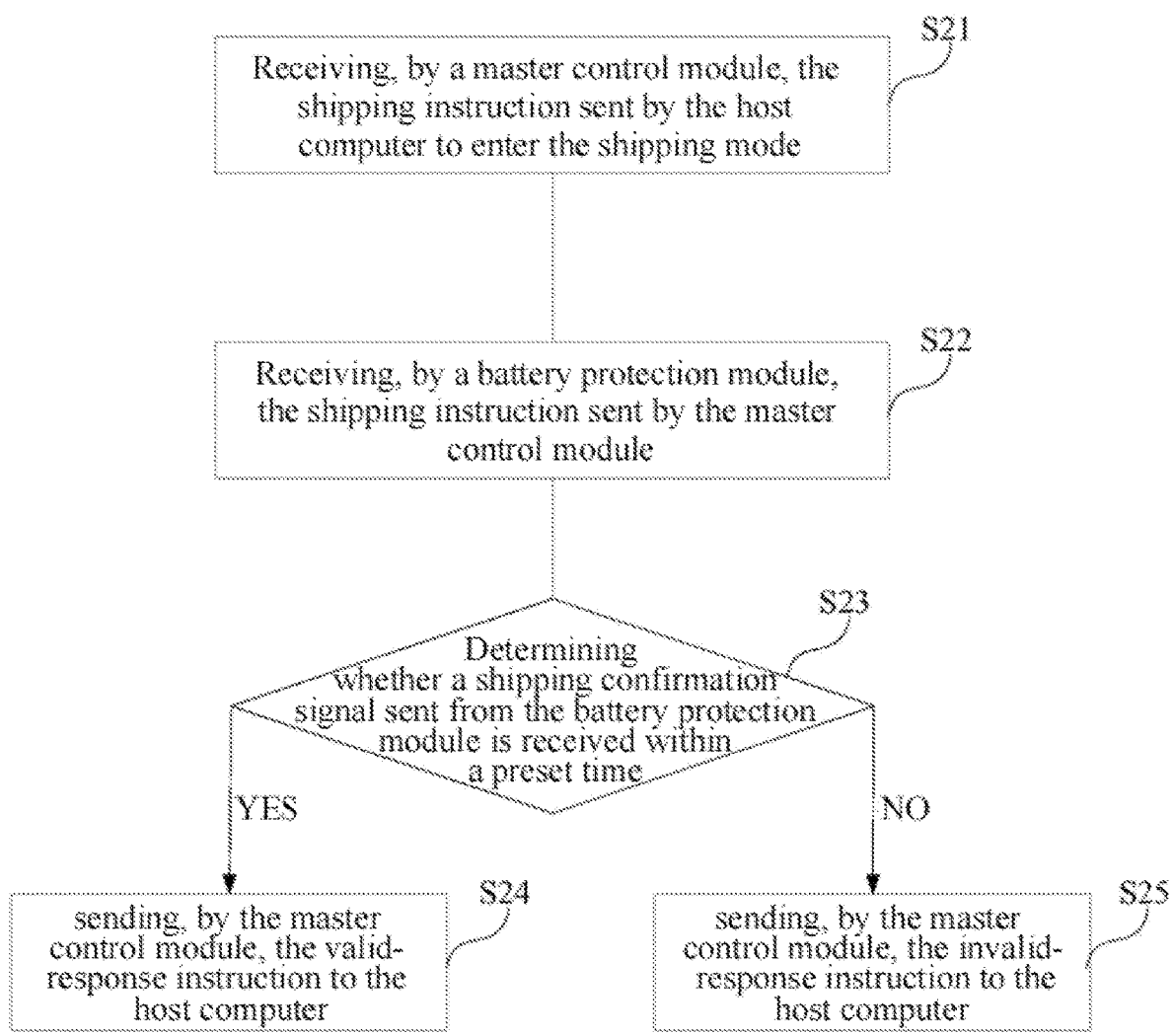
FIG. 2 is a schematic flow diagram of a method for setting a shipping mode of the electronic device in accordance with a second embodiment of the present application.

Referring to FIG. 2, FIG. 2 is a flow diagram of a method for setting a shipping mode of the electronic device in a second embodiment of the present application. The method for setting the shipping mode of the electronic device of this embodiment includes steps S21 to S25.

In step S21: a shipping instruction sent by a host computer to enter the shipping mode is received by a master control module.

In this embodiment, the electronic device includes the master control module and a battery protection module electrically connected to the master control module. The master control module includes a processor and its peripheral circuit. The battery protection module is configured to control power supply of a battery, and it is determined that the electric device is entered the shipping mode when no power is supply by the battery to the master control module and other system circuit modules. In some embodiments, the power supply to the electric device may be controlled more thoroughly after entering the shipping mode, such as non-necessary power consumption units (such as an over-charge voltage protection unit, an over-discharge voltage protection unit, a discharge over-current protection unit, a control unit, a reference voltage generation unit and a frequency generation unit) of the battery protection module are also not powered, and only a wake-up unit used to exit the shipping mode is retained being powered.

In step S22: the shipping instruction sent by the master control module is received by the battery protection module.

In this embodiment, the shipping instruction may be in the form of code, pulse or level.

In step S23: it is determined whether a shipping confirmation signal sent by the battery protection module is received within a preset time.

In this embodiment, if the shipping confirmation signal is received by the master control module, then step S24 is executed; and if the shipping confirmation signal is not received by the master control module, then step S25 is executed. In this embodiment, the preset time may be set to 0.5-1 s.

In step S24: a valid-response instruction is sent by the master control module to the host computer.

In this embodiment, the electronic device is entered the shipping mode after the valid-response instruction is sent by the master control module.

In step S25: an invalid-response instruction is sent by the master control module to the host computer.

In this embodiment, a next shipping instruction can be sent by the host computer at the factory side until the electronic device enters the shipping mode.

Figure 3:
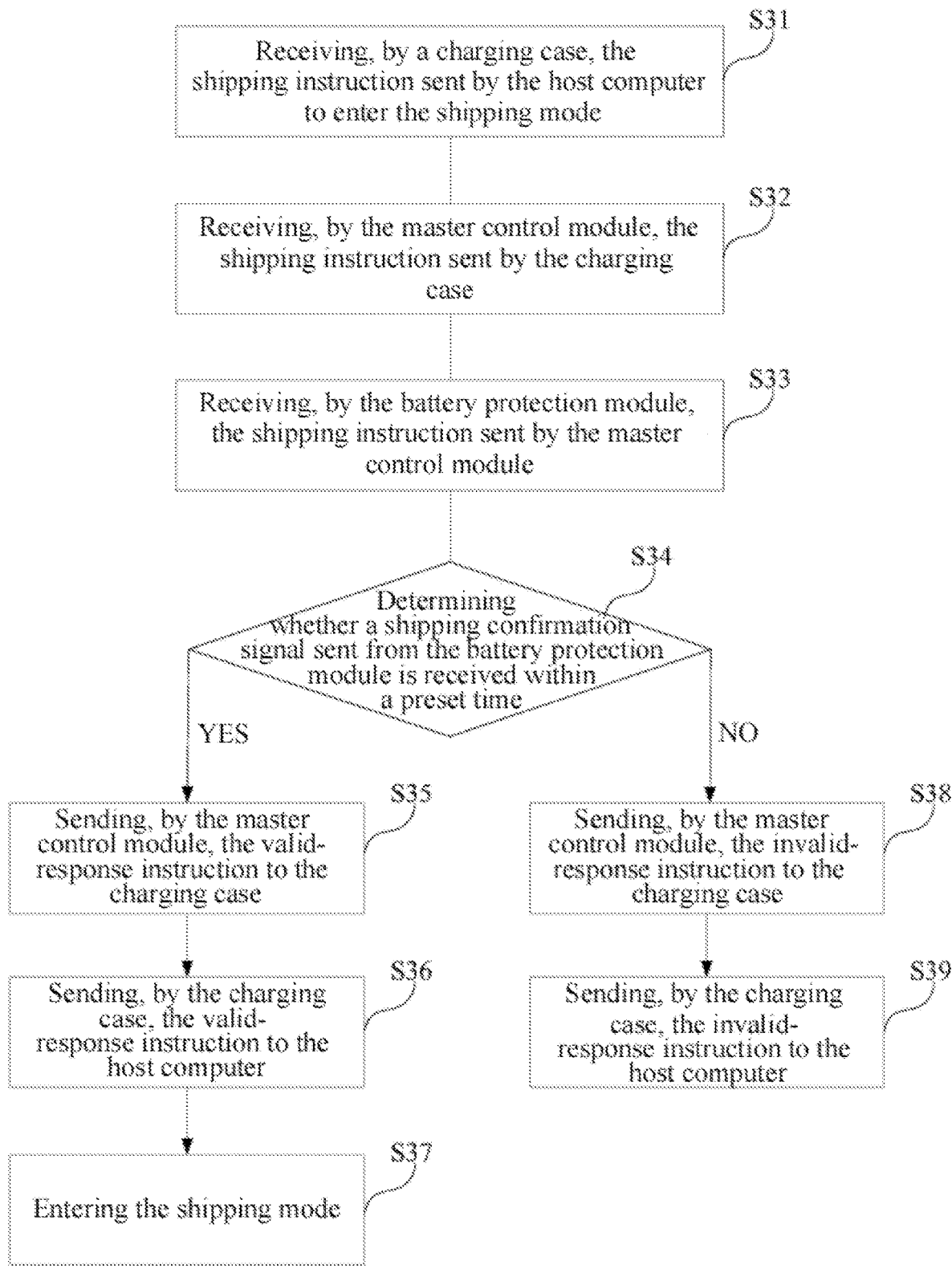
FIG. 3 is a schematic flow diagram of a method for setting a shipping mode of the electronic device in accordance with a third embodiment of the present application.

Referring to FIG. 3, FIG. 3 is a flow diagram of a method for setting a shipping mode of the electronic device in accordance with a third embodiment of the present application. The overall process of this embodiment is the same as the previous embodiments, and the difference is that the electronic device of this embodiment is a true wireless stereo (TWS) headset. In this embodiment, the electronic device is the TWS headset which includes a headset body and a charging case for accommodating the headset body. The master control module and the battery protection module are arranged in the headset body. Compared with the general electronic devices, the TWS headset has a complex structure and a longer signal transmission chain, thus it may not be easy to find out where the problem is in a situation that the shipping mode is not entered when setting the shipping mode.

The method for setting the shipping mode of the electronic device in this embodiment includes steps S31 to S39.

In step S31: a shipping instruction sent by a host computer to enter the shipping mode is received by a charging case.

In this embodiment, the charging case may be connected to the host computer through a serial port to transmit the shipping instruction.

In step S32: the shipping instruction sent by the charging case is received by a master control module.

In this embodiment, the master control module is optionally connected to the charging case in a wireless manner.

In step S33: the shipping instruction sent by the master control module is received by a battery protection module.

In step S34: it is determined whether a shipping confirmation signal sent by the battery protection module is received within a preset time.

In this embodiment, if the shipping confirmation signal is received by the master control module, then steps S35-S37 are executed, and if the shipping confirmation signal is not received by the master control module, then steps S38-S39 are executed.

In step S35: a valid-response instruction is sent by the master control module to the charging case.

In step S36: the valid-response instruction is sent by the charging case to the host computer.

In step S37: the shipping mode is entered.

In step S38: an invalid-response instruction is sent by the master control module to the charging case.

In step S39: the invalid-response instruction is sent by the charging case to the host computer.

The method for setting the shipping mode in this embodiment has the following beneficial effects:

1. An active response mechanism is formed between the host computer and TWS headset, compared to a timer mode applied in the Chinese patent CN111400080A, the signal interaction in this embodiment is only between the host computer and TWS headset, being accurate and timely, while CN111400080A involves a three-party interaction between the host computer, TWS headset and the timer, having a large delay and high cost. CN111400080A also has inaccurate results, such as the headset is broken which may also be wrongly considered as entering the shipping mode.
2. A multi-stage cascade closed-loop signal loop of the host computer, the charging case, the master control module and the battery protection module are formed, which can achieve the effect of active return, passive monitoring, and can quickly locate the specific location of the error, hereby the above problem can be solved.

Figure 4:
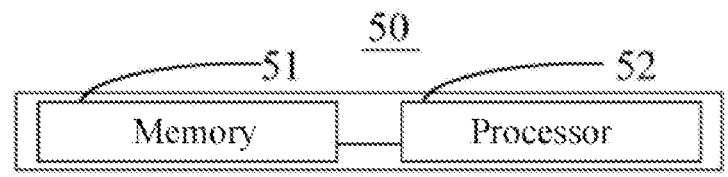
FIG. 4 is a schematic block diagram of the electronic device in accordance with an embodiment of the present application.

Referring to FIG. 4, FIG. 4 is a schematic block diagram of the electronic device in accordance with an embodiment of the present application. The electronic device 50 includes a memory 51 and a processor 52, coupled to each other. The processor 52 is configured to execute program instructions stored in the memory 51, to implement the steps of the method for setting the shipping mode in any of the above embodiments. In a specific implementation scenario, the terminal device 50 may be a TWS headset, a cell phone, a tablet computer, etc.

In an exemplary embodiment, the processor 52 is configured to control itself and the memory 51 to implement the steps of the method for setting the shipping mode in any of embodiments described above. The processor 52 may also be referred to as a central processing unit (CPU). the processor 52 may be an integrated circuit chip having processing capability for signals. The processor 52 may also be a general-purpose processor, a digital signal processor (DSP), an application specific integrated circuit (ASIC), a field-programmable gate array (FPGA), or other programmable logic devices, discrete gate or transistor logic devices, discrete hardware components. The general-purpose processor may be a microprocessor or the processor may also be any conventional processor, etc. Alternatively, the processor 52 may be implemented in combination with the integrated circuit chip.

Figure 5:
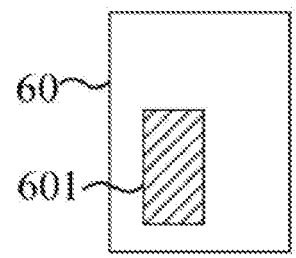
FIG. 5 is a schematic block diagram of a computer readable storage medium in accordance with an embodiment of the present application.

Referring to FIG. 5, FIG. 5 is a schematic block diagram of a computer readable storage medium in accordance with an embodiment of the present application. The computer readable storage medium 60 stores program instructions 601 capable of being run by the processor, and the program instructions 601 are used to implement the steps of the method for setting the shipping mode in any of the above embodiments.

In some embodiments, an apparatus provided by the embodiments of the present disclosure has functions or contains modules that can be used to perform the methods described in the above method embodiments, the specific implementation of which can be referred to the description of the above method embodiments and will not be repeated herein for conciseness.

The description of the above individual embodiments tends to emphasize the differences between these embodiments, the same aspects or similarities of which may be cross-referenced, and will not be repeated herein for the sake of conciseness.

It should be understood that the methods and apparatuses disclosed in the several embodiments provided in this application may be implemented in other ways. For example, the apparatus embodiments described above are merely schematic, e.g., the division of modules or units is only a logical functional division, and may be divided in another way when actually implemented, e.g., the units or components may be combined or may be integrated into another system, or some features may be ignored, or not implemented. In addition, the coupling or direct coupling to each other or communication connection shown or discussed may be indirect coupling or communication connection through some interface, device or unit, which may be implemented in electrical, mechanical or other forms.

Alternatively, each functional unit in the various embodiments of the present application may be integrated in a single processing unit, or each unit may be physically present separately, or two or more units may be integrated in a single unit. The above integrated units can be implemented either in the form of hardware or in the form of software functional units.

The integrated unit, when implemented in the form of a software functional unit and sold or used as a stand-alone product, may be stored in a computer readable storage medium. Based on this understanding, solutions of the present application, or the part that essentially contributes to the existing technologies or all or part of the solutions may be presented in the form of a software product stored in a storage medium, including a number of instructions to enable a computer device (which may be a personal computer, a server, or a network device, etc.) or a processor to perform all or some of the steps of the method in each implementation of the present application. The aforementioned storage media include a USB flash drive, a removable hard disk, a read-only memory (ROM), a random-access memory (RAM), a disk or other media that can store program codes.

Figure 6:
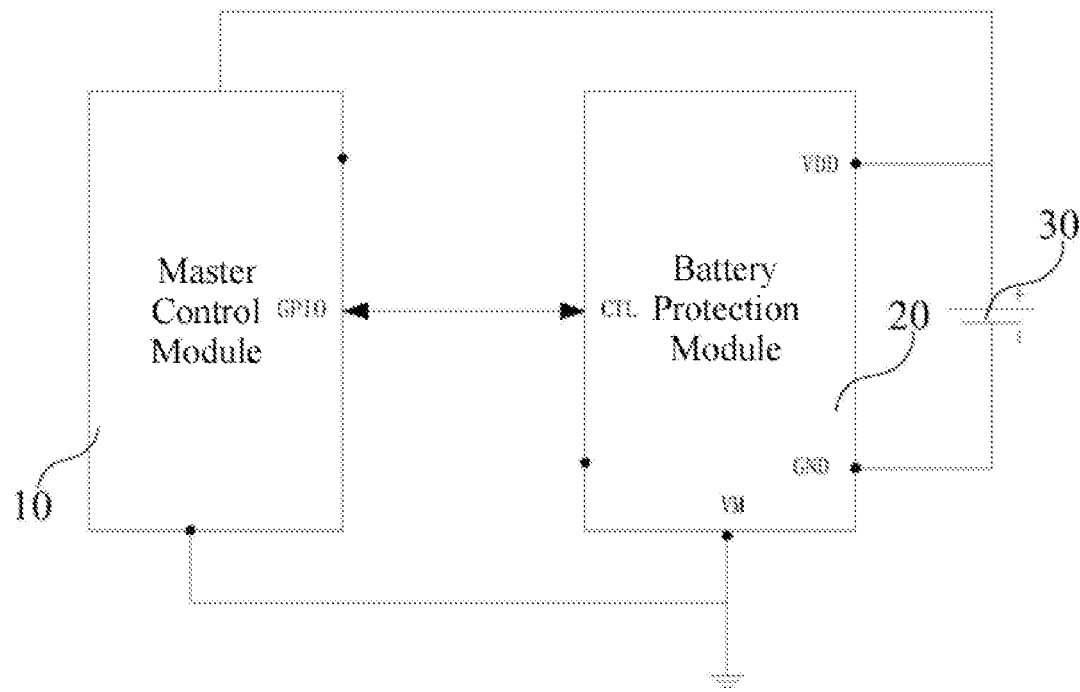
FIG. 6 is a circuit diagram of the electronic device in accordance with an embodiment of the present application.

Referring to FIG. 6, FIG. 6 is a circuit diagram of the electronic device in accordance with an embodiment of the present application. In this embodiment, the electronic device may be a TWS headset, a cell phone, a tablet computer, etc. Here the TWS headset is shown as an example, and in FIG. 6, only the master control module and battery protection module are shown, and the charging case is omitted. The electronic device includes the master control module 10 and the battery protection module 20. The electronic device includes the master control module 10 and the battery protection module 20 electrically connected to the master control module 10, the master control module 10 contains the processor and its peripheral circuitry, the battery protection module 20 is configured to control the power supply of the battery 30, and it is determined that the shipping mode is entered when no power is supplied by the battery to the master control module 10 and other system circuit modules. In some embodiments, the power supply to the electric device may be controlled more thoroughly after entering the shipping mode, such as non-necessary power consumption units (such as the over-charge voltage protection unit, the over-discharge voltage protection unit, the discharge over-current protection unit, the control unit, the reference voltage generation unit and the frequency generation unit) of the battery protection module 20 are also not powered, only the part of the wake-up unit for exiting the shipping mode is retained being powered.

The master control module 10 is provided with an input-and-output pin GPIO, the battery protection module 20 is provided with a power supply pin VDD, a power ground pin GND and a shipping pin CTL. The power supply pin VDD and the power ground pin GND are electrically connected to the positive and negative terminals of the battery 30, respectively, and the shipping pin CTL is electrically connected to the input-and-output pin GPIO. When the shipping instruction from the host computer to enter the shipping mode is received by the master control module 10, the shipping instruction is transmitted from the input-and-output pin to the shipping pin, and the shipping-mode feedback instruction is sent by the master control module 10 to the host computer depending on whether a shipping confirmation signal fed back from the shipping pin is received by the master control module 10. The shipping-mode feedback instruction is a valid-response instruction for a successful entry into the shipping mode or an invalid-response instruction for a failed entry into the shipping mode. The specific circuit for entering the shipping mode may be well-known and will not be described here. The electronic device in this embodiment can actively feed back to the host computer whether the shipping mode is entered, to avoid the problem that the electronic device not really entering the shipping mode can leave the factory due to omission, improving the user experience.

Figure 7:
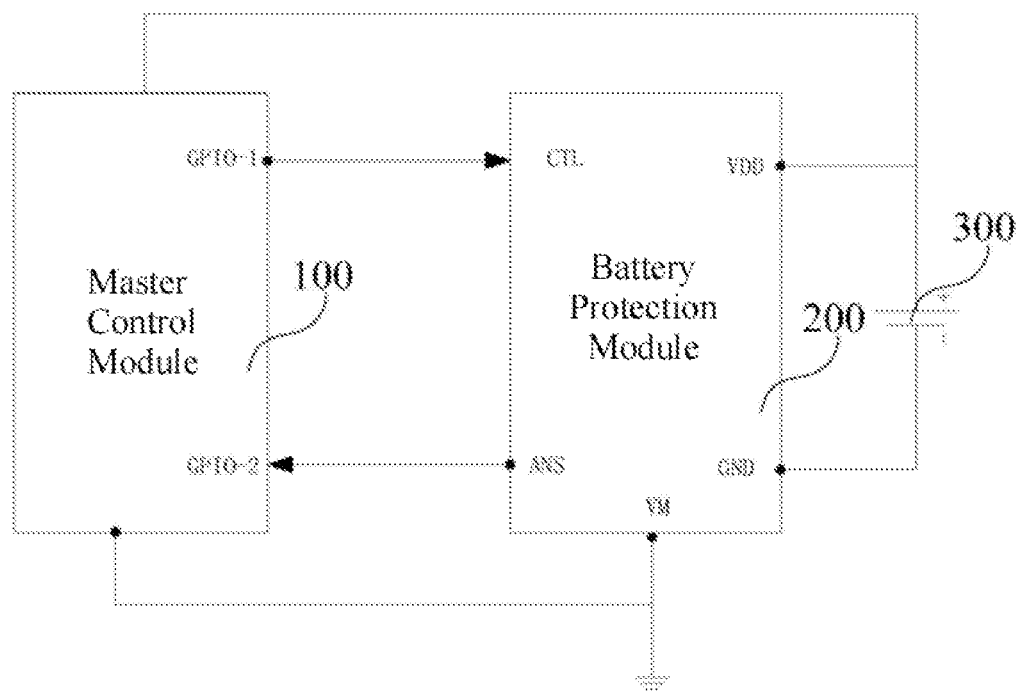
FIG. 7 is a circuit diagram of the electronic device in accordance with another embodiment of the present application.

Referring to FIG. 7, FIG. 7 is a circuit diagram of the electronic device in accordance with another embodiment of the present application. The difference between this embodiment and the previous embodiment is that the pins are not shared, and the sending of the shipping instruction and the receiving of the shipping confirmation signal are achieved through different pins. In an exemplary embodiment, the input-and-output pin of the master control module 100 includes a first input-and-output pin GPIO-1 and a second input-and-output pin GPIO-2, and the battery protection module 200 is also provided with a feedback pin ANS. The shipping instruction is transmitted from the first input-and-output pin GPIO-1 to the shipping pin CTL, and the feedback instruction is sent from the feedback pin ANS to the second input-and-output pin GPIO-2.

The foregoing are only optional embodiments of this application and are not intended to limit the scope of the present application. Any equivalent structural replacement made by using the specification of the present application and the drawings, or applied directly or indirectly in the field of other related technologies, should all be included in the patent protection scope of the present application in the same way.

What is claimed is:

1. A method for setting a shipping mode of an electronic device, comprising:
receiving a shipping instruction sent by a host computer to enter the shipping mode; and
sending a shipping-mode feedback instruction to the host computer, wherein the shipping-mode feedback instruction is a valid-response instruction for a successful entry into the shipping mode or an invalid-response instruction for a failed entry into the shipping mode, wherein the electronic device comprises a master control module and a battery protection module electrically connected to the master control module, and said receiving the shipping instruction sent by the host computer to enter the shipping mode further comprises:

receiving, by the master control module, the shipping instruction sent by the host computer to enter the shipping mode; and receiving, by the battery protection module, the shipping instruction sent by the master control module, and said sending the shipping-mode feedback instruction to the host computer further comprises:

sending, by the master control module, the valid-response instruction to the host computer, in case that a shipping confirmation signal sent from the battery protection module is received within a preset time; and sending, by the master control module, the invalid-response instruction to the host computer, in case that the shipping confirmation signal send from the battery protection module is not received within the preset time, wherein the electronic device is a True Wireless Stereo (TWS) headset, the TWS headset comprises a headset body and a charging case for accommodating the headset body, the master control module and the battery protection module are arranged in the headset body; and said receiving, by the master control module, the shipping instruction sent by the host computer to enter the shipping mode further comprises:

receiving, by the charging case, the shipping instruction sent by the host computer to enter the shipping mode; and receiving, by the master control module, the shipping instruction sent by the charging case, said sending, by the master control module, the valid-response instruction to the host computer further comprises:

sending, by the master control module, the valid-response instruction to the charging case; and sending, by the charging case, the valid-response instruction to the host computer, and said sending, by the master control module, the invalid-response instruction to the host computer further comprises:

sending, by the master control module, the invalid-response instruction to the charging case; and sending, by the charging case, the invalid-response instruction to the host computer.

2. The method for setting a shipping mode according to claim 1, wherein, after the valid-response instruction is sent by the charging case to the host computer, the method further comprises:

entering the shipping mode.

3. The method for setting a shipping mode according to claim 1, wherein the shipping instruction, the shipping-mode feedback instruction and the shipping confirmation signal are respectively in a form of code, pulse or level.

4. An electronic device, comprising a processor and a memory, coupled to each other, wherein the processor is configured to execute a program instruction stored in the memory to perform operations that comprise:

receiving a shipping instruction sent by a host computer to enter the shipping mode; and sending a shipping-mode feedback instruction to the host computer, wherein the shipping-mode feedback instruction is a valid-response instruction for a successful entry into the shipping mode or an invalid-response instruction for a failed entry into the shipping mode, wherein the electronic device comprises a master control module and a battery protection module electrically connected to the master control module, and the operation of receiving the shipping instruction sent by the host computer to enter the shipping mode further comprises:

receiving, by the master control module, the shipping instruction sent by the host computer to enter the shipping mode; and receiving, by the battery protection module, the shipping instruction sent by the master control module, and the operation of sending the shipping-mode feedback instruction to the host computer further comprises:

sending, by the master control module, the valid-response instruction to the host computer, in case that a shipping confirmation signal sent from the battery protection module is received within a preset time; and sending, by the master control module, the invalid-response instruction to the host computer, in case that the shipping confirmation signal send from the battery protection module is not received within the preset time, wherein the electronic device is a True Wireless Stereo (TWS) headset, the TWS headset comprises a headset body and a charging case for accommodating the headset body, the master control module and the battery protection module are arranged in the headset body; and the operation of receiving, by the master control module, the shipping instruction sent by the host computer to enter the shipping mode further comprises:

receiving, by the charging case, the shipping instruction sent by the host computer to enter the shipping mode; and receiving, by the master control module, the shipping instruction sent by the charging case, the operation of sending, by the master control module, the valid-response instruction to the host computer further comprises:

sending, by the master control module, the valid-response instruction to the charging case; and sending, by the charging case, the valid-response instruction to the host computer, and the operation of sending, by the master control module, the invalid-response instruction to the host computer further comprises:

sending, by the master control module, the invalid-response instruction to the charging case; and sending, by the charging case, the invalid-response instruction to the host computer.

5. The electronic device according to claim 4, wherein, after the valid-response instruction is sent by the charging case to the host computer, the operations further comprise an operation of:

entering the shipping mode.

6. The electronic device according to claim 4, wherein the shipping instruction, the shipping-mode feedback instruction and the shipping confirmation signal are respectively in a form of code, pulse or level.

7. A non-transitory computer readable storage medium, on which a program instruction is stored, wherein the program instruction, when executed by a processor, causes the processor to perform operations that comprise:

receiving a shipping instruction sent by a host computer to enter the shipping mode; and sending a shipping-mode feedback instruction to the host computer, wherein the shipping-mode feedback instruction is a valid-response instruction for a successful entry into the shipping mode or an invalid-response instruction for a failed entry into the shipping mode, wherein the electronic device comprises a master control module and a battery protection module electrically connected to the master control module, and the operation of receiving the shipping instruction sent by the host computer to enter the shipping mode further comprises:

receiving, by the master control module, the shipping instruction sent by the host computer to enter the shipping mode; and receiving, by the battery protection module, the shipping instruction sent by the master control module, and the operation of sending the shipping-mode feedback instruction to the host computer further comprises:

sending, by the master control module, the valid-response instruction to the host computer, in case that a shipping confirmation signal sent from the battery protection module is received within a preset time; and sending, by the master control module, the invalid-response instruction to the host computer, in case that the shipping confirmation signal send from the battery protection module is not received within the preset time, wherein the electronic device is a True Wireless Stereo (TWS) headset, the TWS headset comprises a headset body and a charging case for accommodating the headset body, the master control module and the battery protection module are arranged in the headset body; and the operation of receiving, by the master control module, the shipping instruction sent by the host computer to enter the shipping mode further comprises:

receiving, by the charging case, the shipping instruction sent by the host computer to enter the shipping mode; and receiving, by the master control module, the shipping instruction sent by the charging case, the operation of sending, by the master control module, the valid-response instruction to the host computer further comprises:

sending, by the master control module, the valid-response instruction to the charging case; and sending, by the charging case, the valid-response instruction to the host computer, and the operation of sending, by the master control module, the invalid-response instruction to the host computer further comprises:

sending, by the master control module, the invalid-response instruction to the charging case; and sending, by the charging case, the invalid-response instruction to the host computer.

8. The non-transitory computer readable storage medium according to claim 7, wherein, after the valid-response instruction is sent by the charging case to the host computer, the operations further comprise an operation of:

entering the shipping mode.

9. The non-transitory computer readable storage medium according to claim 7, wherein the shipping instruction, the shipping-mode feedback instruction and the shipping confirmation signal are respectively in a form of code, pulse or level.

\* \* \* \* \*